United States Patent [19]

Williams

[11] 4,110,733
[45] Aug. 29, 1978

[54] TRANSMISSION FLUID PRESSURE INDICATOR

[76] Inventor: Eddie C. Williams, 65 Labelle St., Jackson, Tenn. 38301

[21] Appl. No.: 659,049

[22] Filed: Feb. 18, 1976

[51] Int. Cl.$^2$ ............................................. G08B 21/00
[52] U.S. Cl. ......................................... 340/60; 74/856
[58] Field of Search ................... 340/52 R, 60, 236; 200/61.58 R, 61.91; 74/844, DIG. 7, 856

[56] References Cited

U.S. PATENT DOCUMENTS

| 2,711,525 | 6/1955 | Kelley | 340/52 R |
| 3,605,524 | 9/1971 | Debeaud | 74/731 |

Primary Examiner—John W. Caldwell, Sr.
Assistant Examiner—Joseph E. Nowicki
Attorney, Agent, or Firm—Ralph W. Kalish

[57] ABSTRACT

A transmission fluid pressure indicator which comprises fluid pressure-responsive electrical switches engageable within the pressure taps of an automatic transmission and being adapted to be urged into circuit open condition when the fluid pressure in said transmission is at or above a predetermined level. A signaling device, such as a light or a buzzer, is in circuit with said switches so that when the pressure of the transmission fluid descends below the predetermined level, the circuit will be closed and the signal energized to indicate such condition to the operator.

8 Claims, 1 Drawing Figure

U.S. Patent     Aug. 29, 1978     4,110,733
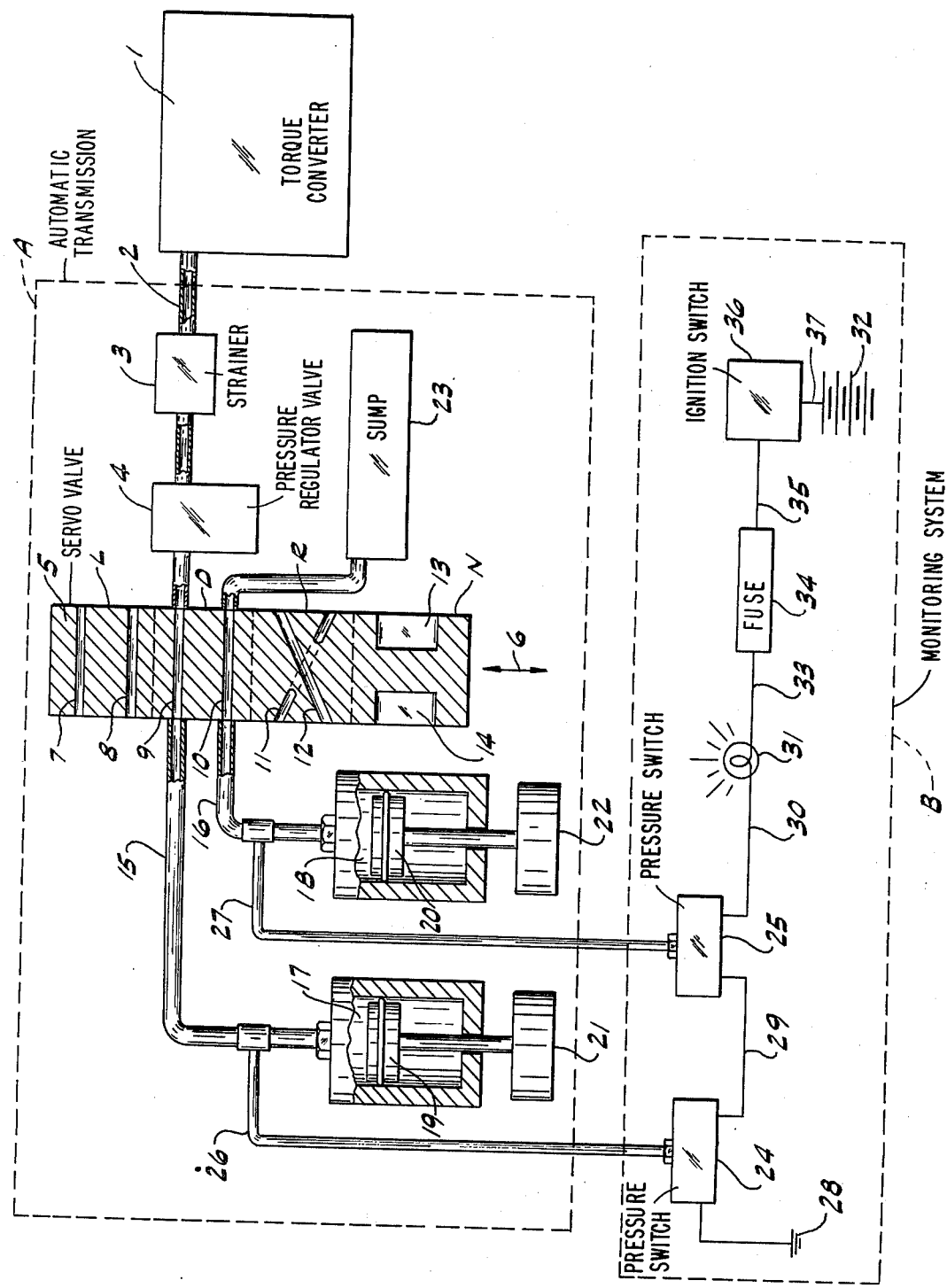

TRANSMISSION FLUID PRESSURE INDICATOR

BACKGROUND AND SUMMARY OF THE INVENTION

This invention relates in general to a vehicular automatic transmission and, more particularly, to a system for monitoring the same to indicate malfunctioning or low fluid level for anticipating potential damage therefrom.

The vast majority of current automobiles incorporate automatic transmissions for transferring torque developed by the engine to the wheels in order that the automobile will smoothly accelerate and shift from low to high gear ratio, as well as vice versa. Within approximately the last 25 years, the automatic transmission has developed into an efficient, yet very complicated mechanism, which when in need of service can be very expensive to repair. Heretofore, a vehicle operator would not be made immediately aware if the fluid pressure within the transmission were to become unacceptably low and could not, therefore, be enabled to correct the low pressure problem before the transmission was seriously damaged as a result thereof.

It has been discovered that most automatic transmission malfunctions requiring costly repair can be attributed to one fundamentally easily perceived condition namely, low transmission fluid pressure; and, thus, if the operator of the vehicle were made cognizant of this condition at the inception thereof, he could then by means of only minor repair or adjustment prevent serious damage to the transmission. For example, if the transmission fluid filter were partially or fully clogged, such could be rectified by cleaning.

It is, therefore, an object of the present invention to provide a system for monitoring the operation of an automatic transmission in a vehicle to indicate malfunction or low fluid level therein.

It is another object of the present invention to provide a system for monitoring the operation of an automatic transmission which does not necessitate any modification of the transmission, nor involve costly installation within an automobile whereby the present system is adapted for application to existing vehicles as an accessory therefor.

It is another object of the present invention to provide a system of the character stated which comprises a limited number of basically conventional components which are economically produced.

It is a still further object of the present invention to provide a system of the character stated which comprises durable components which render the system fully reliable in operation; which may be installed in vehicles in a relatively rapid, economic manner; and the utilization of which markedly contributes to the efficient longevity of the automatic transmission.

BRIEF DESCRIPTION OF THE DRAWING

The FIGURE is a schematic diagram of a conventional vehicular automatic transmission servo fluid circuit incorporating a transmission monitoring system constructed in accordance with and embodying the present invention.

DESCRIPTION OF THE PREFERRED EMBODIMENT

Referring now by reference characters to the drawing which schematically illustrates the preferred embodiment of the present invention, A generally designates a conventional automatic transmission of the general type currently utilized in private automobiles. It is to be understood that the particular construction of automatic transmission A does not form a part of the present invention. For purposes of exposition, said transmission A is connected to a front pump (not shown) operated by a torque converter 1, which latter is engaged to the vehicle motor (not shown). Fluid discharged by the aforesaid front pump is directed along a fluid pressure line 2 within which is disposed the usual strainer 3 and pressure regulator valve 4; said line effecting communication with a conventional servo valve 5 operable by a hand lever (not shown) located for convenient manipulation by the operator of the vehicle. Valve 5 is reciprocally shiftable in the directions indicated by the arrows 6 by means of said lever (not shown); and as indicated in the FIGURE comprehends four valve portions L, D, R, N, which respectively indicate the resultant vehicular function when said portions are operatively disposed with respect to fluid pressure line 2 namely, low, drive, reverse, and neutral, respectively. For purposes of illustration only, valve portions L and D are each shown schematically as having a pair of passages 7, 8 and 9, 10, respectively, while portion R is shown as being provided with passages 11, 12 which are in "X" but non-intersecting relationship. Portion N contains recesses 13, 14 opening at its opposite ends with the former interconnecting line 2 and sump 23 and the latter interconnecting conduits 15, 16.

On the side of servo valve 5 remote from pressure regulator valve 4, transmission A includes the usual fluid conduits 15, 16 for communication with chambers 17, 18 within which are disposed the customary hydraulically operated pistons 19, 20 for operative engagement with the usual front band 21 and rear clutch 22, respectively.

It will thus be seen that when servo valve 5 is in "low" or "drive" position, fluid pressurized by torque converter 1 is forced through line 2 passing through strainer 3 and being subjected to pressure reduction by valve 4 for flow through registering passages 7, 9, as the case may be, and thence through conduit 15 for flow into chamber 17 for exerting pressure upon piston 19 which latter forces front band 21 into position for power transmission through the output shaft (not shown) by way of gearing (not shown) for forward travel in low gear or drive mode, as the case may be. It is recognized that the distinction between such positions D and L results from the prevention of shifting by conventional means from the "low" gear position. In such positions it will be seen that passages 8, 10 will respectively be brought into alignment with conduit 16 for connecting the latter with a sump 23 for venting of the chamber 18 and the associated components. When servo valve 5 is shifted to cause valve portion R to be in operative condition; pressure line 2 will be connected with conduit 16 by passage 11, while conduit 15 will communicate with sump 23 through passage 12. Thus, pressurized fluid will be directed into chamber 18 for acting upon piston 20 to cause clutch 22 to be brought into operative condition for reverse travel of the vehicle; in which state piston chamber 17 is vented to sump 23. By shifting servo valve 5 to dispose valve portion N between conduits 15, 16 and pressure line 2 and sump 23, both pistons 19, 20 will remain in an inactive state since the driving fluid moving through line 2 will be effectively blocked from travel through said valve 5 so that the vehicle will be devoid of engine produced power. As indicated above, the foregoing transmission A is of fundamentally well known character but the limited description is provided for clarifying the precise operation of the monitoring system indicated at B to be described hereinbelow.

Said monitoring system B comprises a pair of fluid pressure responsive electrical switches 24, 25 as for example of the diaphragm type, which are respectively connected to conduits 15, 16 as through the servo apply and reverse pressure taps in the usual transmission casing, but which are schematically illustrated, as at 26, 27, respectively. Pressure switch 24 through one of its terminals is connected to ground, as at 28, and at its opposite terminal is connected by a lead 29 to one terminal of pressure switch 25; the other terminal of the latter being in circuit by a conductor 30 with a signaling device 31, such as a warning light. Device 31, as a light, is disposed for ready noticeability by the vehicle operator, such as upon the dashboard; and device 31 is connected to a convenient source of electrical power, such as a battery 32, through a lead 33, a fuse 34, a conductor 35, and ignition switch 36, which latter through one of its terminals is directly connected to battery 32 by lead 37.

Fluid pressure switches 24, 25 are designed for circuit closure condition when the fluid pressure within transmission A falls below a predetermined level and, hence, conversely, to remain in circuit open condition when the transmission fluid pressure is at or above such level. The particular level is established to coincide with the minimum pressure limit for proper transmission operation. Thus, for example, such critical level may be reached when the transmission fluid has a deficiency of a preselected fluid volume, such as, for instance, 2½ to 3 quarts. Thus, if the deficiency exceeds such volume, the resultant fluid pressure will have been decreased to a point causing switches 24, 25 to close.

In operation, with servo valve 5 shifted to dispose the transmission in neutral condition, that is, with conduits 15, 16 being both vented to sump 23 through passage 13, whereby said conduits 15, 16 are effectively blocked from flow of pressurized fluid from torque converter 1, the operator will close ignition 36 for completing the circuit between battery 32 and ground 28. The fluid pressure acting upon switches 24, 25 will in such neutral condition be below the predetermined level for switch opening so that signal device 31 will be energized, such as the illumination of light. When the operator shifts serve valve 5 for forward vehicle travel thus disposing valve portions L or D, as the case may be, into position for connecting conduit 15 with pressure line 2 and conduit 16 with sump 23, the fluid pressure acting upon switches 24, 25 will be above the aforesaid predetermined level, during normal operation, and thereby cause said switches 24, 25 to open, breaking the circuit and causing de-energization of the signal device 31, such as extinguishment of a light, indicating to the operator that the transmission fluid pressure is at or above the predetermined minimum acceptable limit. Similarly, upon shifting of servo valve 5 into reverse position so that passages 11, 12 of valve portion R respectively interconnect conduit 15 and sump 23, and conduit 16 and pressure line 2, under normal operating conditions, the said switches 24, 25 will be opened and thereby de-energize the signaling device, also indicating proper transmission fluid pressure.

In the event the fluid pressure within transmission A has fallen below the aforesaid level, it is evident that when servo valve 5 is shifted into either of its forward travel conditions or for reverse travel, switches 24, 25 will remain in circuit-closing condition, so that the signal device 31, such as a light, will remain in energized or "on" condition indicating to the operator that the transmission fluid pressure has reached an unacceptably low level so that a condition of potential serious damage to the transmission is created. In the majority of cases, such condition may be remedied by adding the requisite volume of transmission fluid to the system or by causing the strainer 3 to be cleaned or replaced since strainer clogging can be a cause of such pressure reduced condition.

Accordingly, simple corrective measures, if promptly undertaken, will prevent costly damage to the transmission.

Thus, from the foregoing, it will be seen that a unique monitoring system has been disclosed which continually indicates to a vehicle operator whether the fluid pressure within the automatic transmission is above or below a predetermined minimum operating level. It is apparent that the present invention may be incorporated in an automobile as original factory equipment or, if desired, may constitute an accessory obtainable in the after-market for facile installation within a vehicle with the pressure switches 24, 25 being engageable within the pressure tap holes customarily found in current transmissions. It is, of course, manifest that any type of suitable signaling device may be utilized in lieu of a light, such as an audible signal, as a buzzer, if desired, without departing from the scope of the present invention.

For clarity, it should be understood that when the strainer 3 is clogged or stopped up, the transmission fluid is hence prevented from circulating and the pressure will fall with the particular signal device 31 being energized. The fluid will tend to back up in the case and will misleadingly indicate that the transmission is overfilled by the reading on the gage stick.

Having described my invention, what I claim and desire to obtain by Letters Patent is:

1. In a vehicle having an automatic transmission with a pressurized fluid inlet connected to a source of pressurized fluid, a first fluid-operated piston chamber and piston connected to a front band, a second fluid operated piston chamber and piston engaged to a rear clutch, a first conduit connected at one end to said first chamber, a second conduit connected at one end to said second chamber, a valve member disposed between said first and second conduits and said pressurized fluid inlet, and means for selectedly positioning said valve member for connecting said first and second conduits with said pressurized fluid inlet, the improvement comprising a monitor for indicating the fluid pressure within said transmission to demonstrate the fluid level comprising a first fluid pressure-responsive switch, means connecting said first switch and said first conduit, a second fluid pressure responsive switch, means connecting said second switch and said second conduit, a source of electrical power, a signaling device, and circuit-forming means interconnecting said source of electrical power, said signaling device and said first and second switches whereby when the fluid pressure within both of said first and second conduits descends below a predetermined level both said first and second switches are affected for causing responding indicating action of said signaling device.

2. The improvement as defined in claim 1 and further characterized by said signaling device being a visual signal.

3. The improvement as defined in claim 1 and further characterized by said first and second pressure-responsive switches being of the type normally closed when fluid pressure falls below a predetermined level and said signaling device being adapted for being actuated by said source of electrical power, whereby when the fluid pressure within both of said first and second conduits descends below a predetermined level each said switch is closed for completing the circuit to said signaling device for actuating the same for indicating purposes.

4. The improvement as defined in claim 1 and further characterized by said means connecting said first switch and said first conduit being first conduit means, and said means connecting said second switch and said second conduit being second conduit means.

5. The combination with an automatic transmission having a pressurized fluid inlet connected to a source of pressurized fluid, a first fluid-operated piston chamber and piston connected to a front band, a second fluid-operated piston chamber and piston connected to a rear clutch, a first conduit connected at one end to said first chamber, a second conduit connected at one end to said second chamber, a valve member disposed between said first and second conduits and said pressurized fluid inlet, means for selectedly positioning said valve member for connecting said first and second conduits with said pressurized fluid inlet, a first tap connected to said first conduit between said valve and said first chamber, and a second tap connected to said second conduit between said valve member and said second chamber, of an improvement comprising a monitor for indicating the pressure level within said transmission to demonstrate the fluid level therein comprising a first fluid pressure-responsive switch, means connecting said first switch and said first tap, a second fluid pressure-responsive switch, means connecting said second switch and said second tap, a source of electrical power, a signaling device, and circuit-forming means interconnecting said source of electrical power, said signaling device, and said first and second switches whereby when the fluid pressure within both of said first and second conduits descends below a predetermined level both said first and second switches are affected for causing responding indicating action of said signaling device.

6. The combination as defined in claim 5 and further characterized by said first and second switches being of the type normally closed when fluid pressure falls below a predetermined level and being in series, said signaling device being adapted for being actuated by said source of electrical power whereby when the fluid pressure within both of said first and second conduits descends below a predetermined level each said switch is closed for completing the circuit to said signaling device and causing actuation thereof.

7. The combination as defined in claim 6 and further characterized by said signaling device being a visual signal.

8. The combination as defined in claim 6 and further characterized by said signaling device being a visual signal.

* * * * *